C. MORRIS.
NUT BLANCHING MACHINE.
APPLICATION FILED SEPT. 27, 1920.
1,377,090.
Patented May 3, 1921.
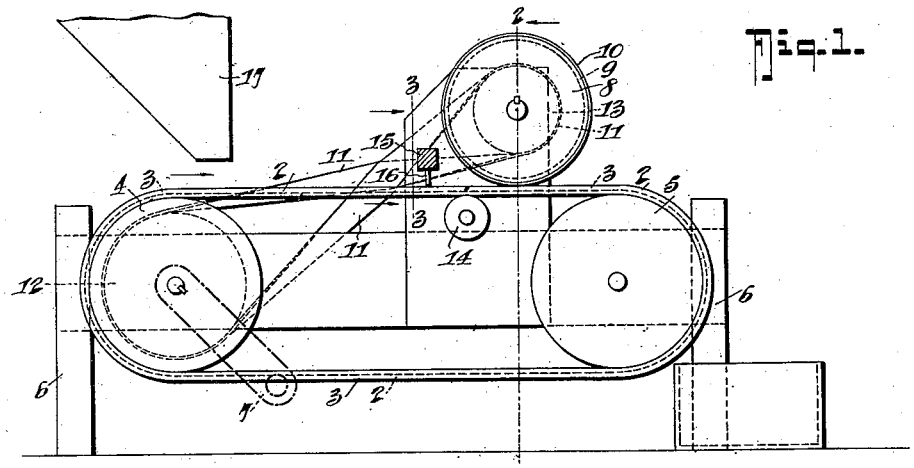
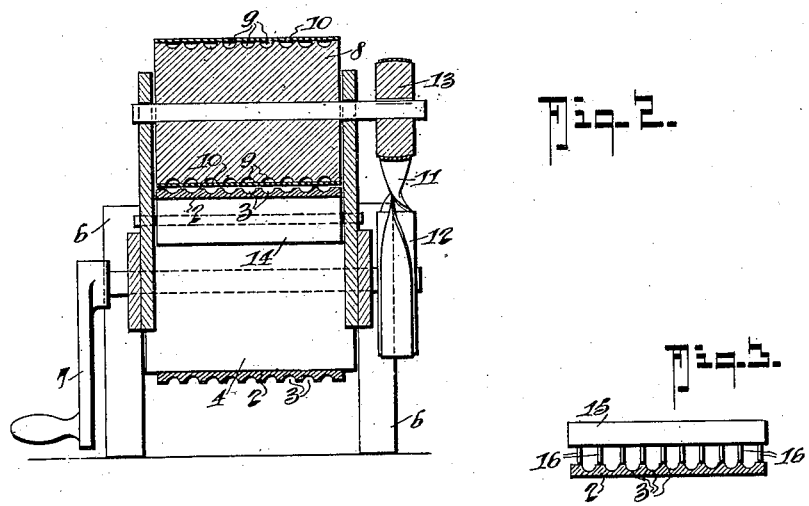
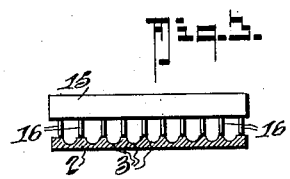
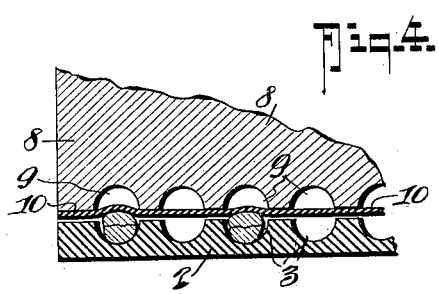
Inventor
Charles Morris
By Fred G. Dieterich
Attorneys

UNITED STATES PATENT OFFICE.

CHARLES MORRIS, OF VANCOUVER, BRITISH COLUMBIA, CANADA.

NUT-BLANCHING MACHINE.

1,377,090.  Specification of Letters Patent.  Patented May 3, 1921.

Application filed September 27, 1920. Serial No. 413,029.

*To all whom it may concern:*

Be it known that I, CHARLES MORRIS, citizen of the Dominion of Canada, residing at Vancouver, in the Province of British Columbia, Canada, have invented certain new and useful Improvements in Nut-Blanching Machines, of which the following is a specification.

This invention relates to a machine for removing the inner layer of skin from the kernels of such nuts as peanuts or almonds after the outer shell has been removed.

This operation is termed "blanching" as it removes the brown skin and reveals the white kernel.

Machines are in use to effect the removal of this skin but in all with which I am acquainted a large proportion of the kernels are broken or are separated into their natural lobes or halves.

This breaking of the kernel is not material when the nuts are to be ground up, but where blanched nuts are required, it is desirable that the kernel be preserved whole.

It is to effect the removal of the inner skin of a nut without injury to the kernel, that the machine, which is the subject of this application, is devised.

The invention is particularly described in the following specification, reference being made to the drawings by which it is accompanied, in which:

Figure 1 is a side elevation of the device with one side of the framework removed.

Fig. 2, a vertical cross section on the line 2—2 in Fig. 1 looking in the direction of the arrow 2.

Fig. 3, a cross section on the line 3—3 in Fig. 1 showing the comb or separator which alines the nuts in the grooves of the band, and Fig. 4 is a section to an enlarged scale showing the skin removing contact of the band and upper roller.

In these drawings 2 represents an endless, flexible band passing around pulleys 4 and 5, removably mounted in the frame 6 of the machine, one of which pulleys 4 is driven by a crank handle 7 secured to the shaft of the pulley, or by other suitable means from a convenient source of power.

The band 2 is formed with longitudinal grooves 3, and adjacent one of the pulleys 5 a roller 8 is rotatably mounted in the frame 6 to be parallel to and above the band 2.

This roller is circumferentially grooved as at 9 to correspond with the grooves of the band 2, and over the ridges of the grooves 9 is stretched a sheating 10 of flexible, resilient material such as thin rubber.

The roller 8 is driven with its under side traveling in the same direction as the band 2 but at a higher rate of speed, by a band 11 from a pulley 12 secured on the shaft of the roller 4 and around a pulley 13 secured on the shaft of the roller 8.

Adjacent the contact of the roller 8 the band 2 is supported by an idler 14 extending across the width of the band.

Across the upper side of the band 2 immediately in front of the roller 8 is a bar 15 having wires 16 downwardly projecting from it, which are pitched to correspond with the ridges of the longitudinal grooves 3 of the band.

The nut kernels are delivered onto the band 2, either from a hopper 17 or by hand, and are rectified or disposed lengthwise in the grooves 3 by the downwardly projecting wires 16. As the nuts in the grooves 9 of the band pass under the flexible sheath 10 stretched over the grooves 9 of the roller 8, which roller is traveling in the same direction at a higher rate of speed, the skin of the kernel is rubbed from it by the yielding pressure of the sheath 10, after which the light fragments of the skin are fanned from the kernels and they are sorted for such further treatment as may be necessary.

It may happen that a few large sized nut kernels may closely follow one another in one groove while the adjacent grooves may have only a few and smaller kernels, in which case the depression of the belt caused by the larger kernels may allow the kernels of the adjacent grooves to pass without being effectively rubbed clean of the skin.

To overcome this possibility I may find it advisable to provide a series of endless grooved belts separate from one another, whereby the depression of one will not affect those adjacent.

I do not desire to be confined to the particular construction of the machine as hereinbefore described, but claim protection broadly on the features by which the desired result is attained, viz., the yielding engagement of the opposite sides of the nut between two surfaces traveling at different speeds whereby the desired rubbing action is effected to remove the skin. These features of the invention are fully set forth in the following claims.

Claims:

1. A means for removing the inner skin of a nut, which adheres to the kernel, said means comprising an endless grooved band in combination with a grooved roller having a yielding envelop around the same.

2. A means for removing the inner skin of a nut which adheres to the kernel, said means comprising a traveling surface on which the nuts are deposited in coöperation with a grooved roller covered with a sheathing of flexible resilient material.

3. A means for removing the inner skin of a nut which adheres to the kernel, said means comprising a lengthwise grooved traveling band into the groove of which the kernels are delivered, and a thin band of flexible resilient material yieldingly supported over the grooved band, means for traveling the grooved band and for traveling the adjacent side of the thin band in the same direction at a higher rate of speed.

4. A means for removing the inner skin of a nut which adheres to the kernel, said means comprising a lengthwise grooved endless band, pulleys supporting and driving said band, a roller rotatably mounted parallel to and above the upper surface of the traveling band, said roller circumferentially grooved to correspond with the lengthwise grooves of the traveling band, a sheath of thin flexible material stretched over the ridges of the grooved roller, and means for driving the superposed grooved roller and its sheath to travel its under side in the same direction as the band at a higher rate of speed.

5. A means for removing the inner skin of a nut which adheres to the kernel, said means comprising an endless lengthwise grooved flexible band, pulleys supporting and driving said band, a roller rotatably mounted over the traveling band, said roller circumferentially grooved to correspond with the grooves of the traveling band, a sheathing of thin flexible material stretched over the ridges of the grooves of the roller, means for supporting the band adjacent the superposed roller, and means for driving the roller to move the underside in the same direction as the band at a higher speed.

6. A means for removing the inner skin of a nut which adheres to the kernel, said means comprising an endless lengthwise grooved band, pulleys supporting and driving said band, a roller rotatably mounted over the band, said roller circumferentially grooved to correspond with the grooves of the traveling band, a sheathing of thin flexible material stretched over the grooved ridges of the roller, means for delivering the nuts onto the traveling band, means for rectifying the nuts in the grooves of the band, and means for rotating the roller to move its underside in the same direction as the band at a higher rate of speed.

In testimony whereof I affix my signature.

CHARLES MORRIS.